(12) United States Patent
Park et al.

(10) Patent No.: US 11,617,700 B2
(45) Date of Patent: Apr. 4, 2023

(54) ROBOT FOR UPPER-LIMB REHABILITATION

(71) Applicant: NEOFECT Co., Ltd., Seongnam-si (KR)

(72) Inventors: Min Jae Park, Gunpo-si (KR); Hyeon Jae Ju, Asan-si (KR); Young Geun Choi, Gyeonggi-do (KR)

(73) Assignee: NEOFECT Co., Ltd., Seongnam-si (KR)

(*) Notice: Subject to any disclaimer, the term of this patent is extended or adjusted under 35 U.S.C. 154(b) by 643 days.

(21) Appl. No.: 16/729,071

(22) Filed: Dec. 27, 2019

(65) Prior Publication Data

US 2020/0129365 A1   Apr. 30, 2020

Related U.S. Application Data

(63) Continuation of application No. PCT/KR2018/006203, filed on May 31, 2018.

(30) Foreign Application Priority Data

Jun. 30, 2017   (KR) .................. 10-2017-0083033
Aug. 3, 2017   (KR) .................. 10-2017-0098312

(51) Int. Cl.
*A61H 1/02* (2006.01)
*B25J 9/00* (2006.01)

(52) U.S. Cl.
CPC .......... *A61H 1/0288* (2013.01); *B25J 9/0006* (2013.01); *A61H 2205/067* (2013.01)

(58) Field of Classification Search
CPC .. A61H 1/0288; A61H 1/0281; A61H 1/0274; A61H 2205/067; B25J 9/006; A61F 5/0118; A63B 23/16
See application file for complete search history.

(56) References Cited

U.S. PATENT DOCUMENTS 3,967,321 A * 7/1976 Ryan .................. A61F 4/00
                                                    623/24
4,949,711 A * 8/1990 Gyovai ............... A63B 21/023
                                                    601/40

(Continued)

FOREIGN PATENT DOCUMENTS

CN        111282211 A  *  6/2020
JP        2013-106706 A     6/2013

(Continued)

OTHER PUBLICATIONS

International Search Report issued in PCT/KR2018/006203; dated Sep. 6, 2018.

(Continued)

*Primary Examiner* — Christie L Bahena
(74) *Attorney, Agent, or Firm* — Studebaker & Brackett PC

(57) ABSTRACT

The inventive concept relates to an upper-limb rehabilitation robot that includes a finger exercise device that is mounted on the back of a patient's hand and that exercises a finger of the patient for rehabilitation, a wrist exercise device that is provided on a wrist of the patient and that exercises the wrist of the patient, and an upper-limb exercise device that is spaced apart from the wrist exercise device and that exercises an upper limb of the patient.

9 Claims, 5 Drawing Sheets

(56) References Cited

U.S. PATENT DOCUMENTS

| | | | | |
|---|---|---|---|---|
| 5,020,521 A | * | 6/1991 | Salort | A61F 5/0118 |
| | | | | 602/20 |
| 5,103,807 A | * | 4/1992 | Makaran | A61H 1/0288 |
| | | | | 601/40 |
| 2006/0264792 A1 | * | 11/2006 | Bonn | A61F 5/0118 |
| | | | | 602/21 |
| 2009/0030353 A1 | * | 1/2009 | Bonutti | A61H 1/0274 |
| | | | | 601/5 |

FOREIGN PATENT DOCUMENTS

| | | | | |
|---|---|---|---|---|
| KR | 10-0558023 B1 | 3/2006 | | |
| KR | 10-2012-0015704 A | 2/2012 | | |
| KR | 101163903 B1 | 7/2012 | | |
| KR | 10-1489795 B1 | 2/2015 | | |
| KR | 10-1603162 B1 | 3/2016 | | |
| WO | WO-2015095459 A1 | * | 6/2015 | A61F 2/586 |
| WO | 2016/205356 A1 | 12/2016 | | |
| WO | WO-2016205356 A1 | * | 12/2016 | A61F 5/0127 |

OTHER PUBLICATIONS

Office Action issued in KR 10-2017-0098312; mailed by the Korean Patent Office dated Sep. 28, 2018.

* cited by examiner

ROBOT FOR UPPER-LIMB REHABILITATION

CROSS-REFERENCE TO RELATED APPLICATIONS

The present application is a continuation of International Patent Application No. PCT/KR2018/006203, filed on May 31, 2018 which are based upon and claims the benefit of priority to Korean Patent Application Nos. 10-2017-0083033 filed on Jun. 30, 2017 and 10-2017-0098312 filed on Aug. 3, 2017. The disclosures of the above-listed applications are hereby incorporated by reference herein in their entirety.

BACKGROUND

Embodiments of the inventive concept described herein relate to an upper-limb rehabilitation robot, and more particularly, relate to an upper-limb rehabilitation robot for simultaneously carrying out rehabilitation exercises for a finger, a wrist, and an upper limb.

In general, joints of a human body have a structure in which body parts adjacent to the joints are rotatable about the joints.

Meanwhile, elderly people or rehabilitation patients with low muscular strength have difficulty in joint motion, compared to healthy people, and it is realistically difficult for the elderly people or the rehabilitation patients to do exercises with general exercise equipment even though substantially requiring exercises.

In particular, in the case of a stroke or Parkinson's disease, various physical changes appear depending on the state of the disease. Especially, these diseases are accompanied by phenomena in which hands are paralyzed and fingers are contracted.

If the paralysis of the hands and the contraction of the fingers are just left continually, muscles or joints become harder, and the patients may feel pain when moving and may have difficulty in normal activities even though nerves are restored.

Furthermore, patients who had surgery on joints such as a wrist and a shoulder cannot do exercises by themselves, and therefore the joints of the wrist and the shoulder are at risk for being stiffened due to weak muscles and poor nutrition.

Accordingly, it is very important to cause the patients to maintain exercise capacity to the maximum by promoting blood circulation and neural communication by continually rehabilitating paralyzed or disabled hands.

That is, to prevent deformation of the joints and return to normal activities, the patients have to do rehabilitation exercises including pains for a long time.

SUMMARY

Embodiments of the inventive concept provide an upper-limb rehabilitation robot for carrying out rehabilitation exercises while changing joint angles of a hand, a wrist, and an upper limb of a patient without applying an excessive force.

According to an exemplary embodiment, an upper-limb rehabilitation robot includes a finger exercise device that is mounted on the back of a patient's hand and that exercises a finger of the patient for rehabilitation, a wrist exercise device that is provided on a wrist of the patient and that exercises the wrist of the patient, and an upper-limb exercise device that is spaced apart from the wrist exercise device and that exercises an upper limb of the patient.

The finger exercise device may include a back-of-hand mounted part mounted on the back of the patient's hand, a strap that forms a travel path on the back-of-hand mounted part, a finger coupling part that supports one end portion of the strap and that is coupled to the finger of the patient, and a strap actuator that is provided on the back-of-hand mounted part and that winds or unwinds the strap supported on the finger coupling part.

The strap actuator may include a strap winding roller around which the strap is wound or from which the strap is unwound and a strap drive motor that rotates the strap winding roller forward or backward.

The upper-limb rehabilitation robot may further include a strap guide roller that is provided on the travel path of the strap and that guides a movement of the strap.

The wrist exercise device may include a wrist mounting part on which the wrist is mounted and a track that is provided along a rotational path of the wrist and that guides rotational motion of the wrist mounting part.

The upper-limb rehabilitation robot may further include a roller connected with the wrist mounting part and provided in the track so as to be movable while rolling along the track by the rotational motion of the wrist mounting part.

The upper-limb exercise device may include an elbow mounting part on which an elbow is mounted and a lifting operation part that operates depending on lifting motion of the upper limb mounted on the elbow mounting part.

The lifting operation part may include a first joint link pivotally hinged to the elbow mounting part, a second joint link pivotally hinged to the first joint link, a pivot joint pivotally hinged to the first joint link and the second joint link, and a pivot motion part that allows the first joint link, the second joint link, and the pivot joint to pivot depending on the lifting motion of the upper limb mounted on the elbow mounting part.

The pivot motion part may include a spring that has one end portion supported by the first joint link and that is compressed or stretched, a first wire pulley provided in the first joint link so as to be spaced apart from the spring, a second wire pulley provided in a portion where the first joint link is hinged to one end portion of the second joint link, a third wire pulley provided in the pivot joint, a fourth wire pulley provided in an opposite end portion of the second joint link, and a wire having a predetermined length and including one end portion supported by an opposite end portion of the spring and an opposite end portion supported by the fourth wire pulley, in which the wire passes over the first wire pulley, the second wire pulley, and the third wire pulley.

The upper-limb exercise device may further include a left/right operation part that operates depending on a left/right movement of the upper limb.

The left/right operation part may include a pair of arms movable toward or away from each other and a bracket pivotally hinged to facing end portions of the pair of arms to correspond to the left/right movement of the upper limb, and one of the pair of arms may be hinged to the pivot joint.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
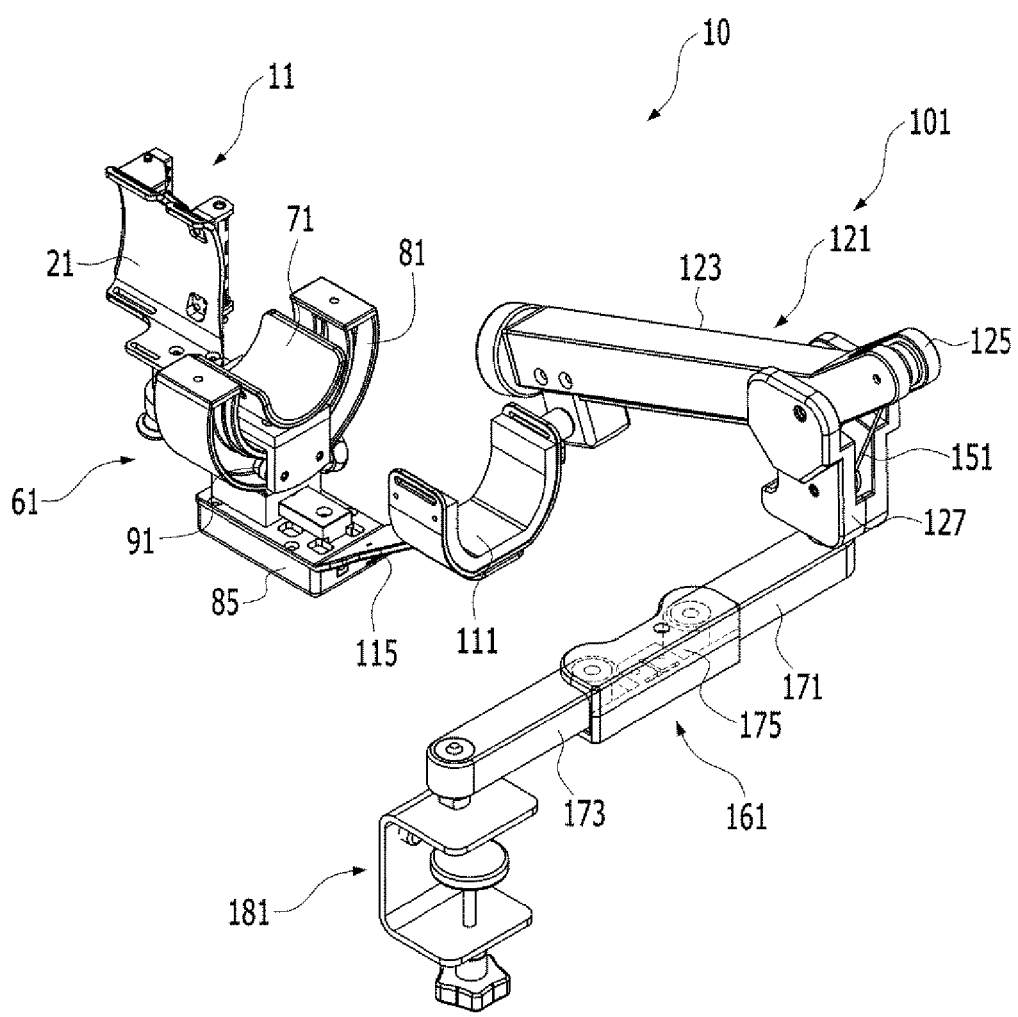
FIG. 1 is a front perspective view illustrating an upper-limb rehabilitation robot according to an embodiment of the inventive concept.
Figure 2:
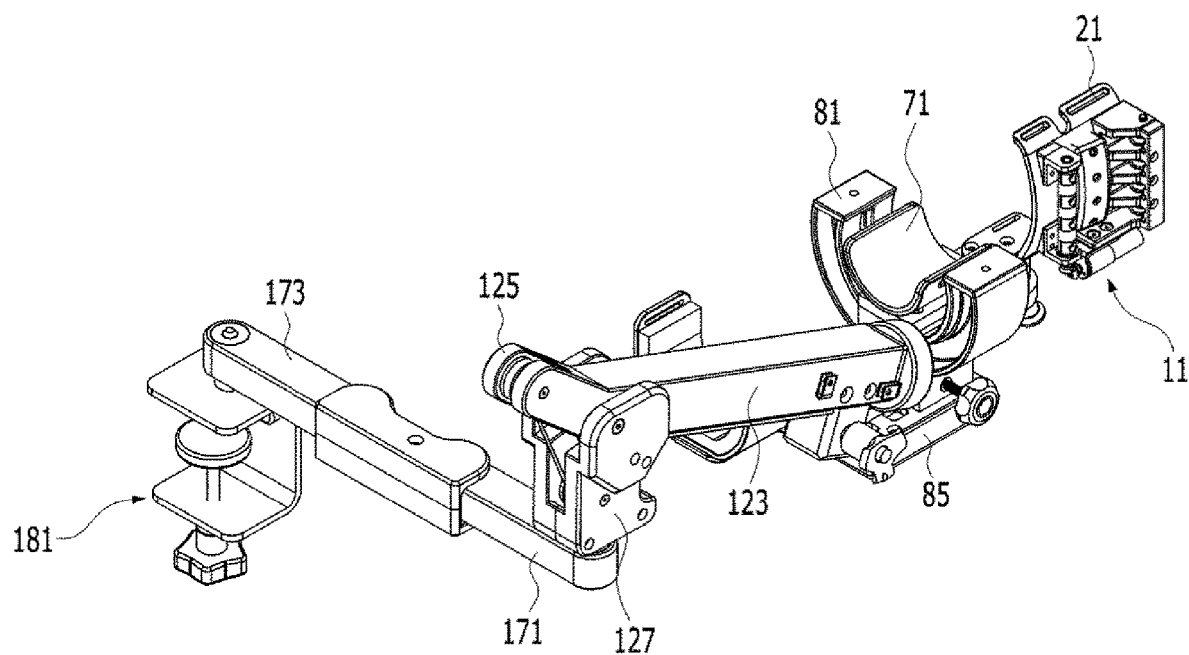
FIG. 2 is a rear perspective view illustrating the upper-limb rehabilitation robot of FIG. 1.
Figure 3:
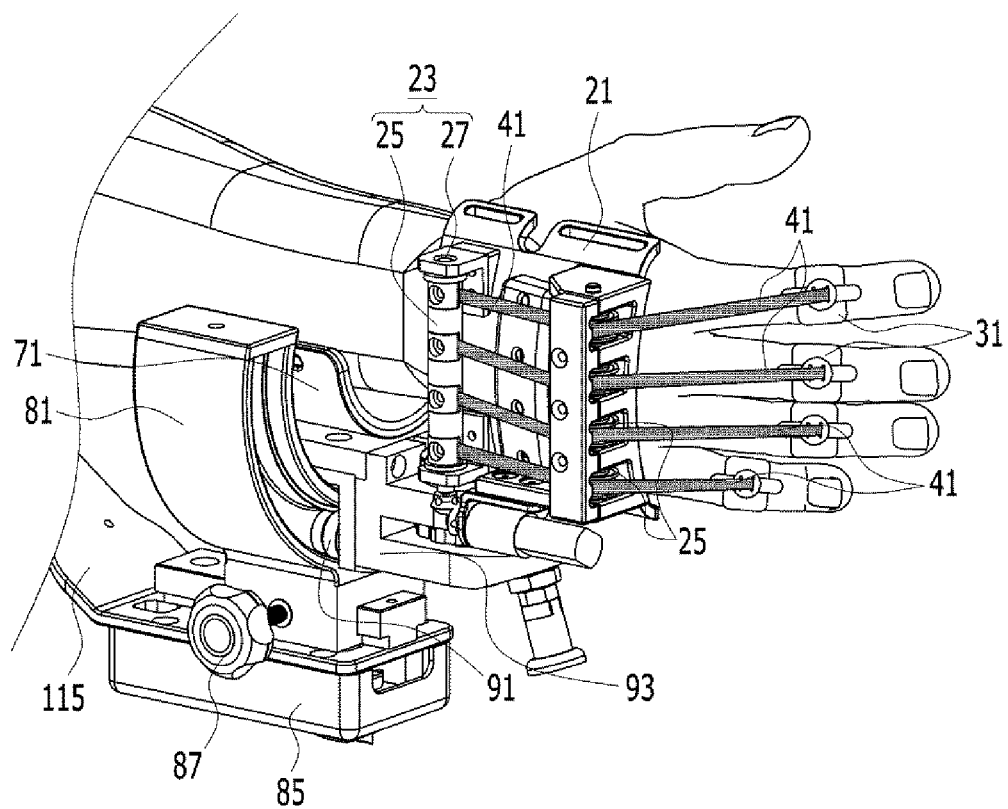
FIG. 3 is an enlarged view illustrating major components of a finger exercise device of FIG. 1.

The aspects, features, and advantages of the inventive concept will become apparent from the following description of embodiments given in conjunction with the accompanying drawings. However, the inventive concept is not limited to the embodiments disclosed herein and may be implemented in various different forms. Herein, the embodiments are provided to provide complete disclosure of the inventive concept and to provide thorough understanding of the inventive concept to those skilled in the art to which the inventive concept pertains.

Terms used herein are only for description of embodiments and are not intended to limit the inventive concept. As used herein, the singular forms are intended to include the plural forms as well, unless context clearly indicates otherwise. It will be further understood that the terms "comprise" and/or "comprising" specify the presence of stated features, components, and/or operations, but do not preclude the presence or addition of one or more other features, components, and/or operations. In addition, identical numerals will denote identical components throughout the specification, and the meaning of "and/or" includes each mentioned item and every combination of mentioned items. It will be understood that, although the terms first, second, etc. may be used herein to describe various components, these components should not be limited by these terms. These terms are only used to distinguish one component from another component. Thus, a first component discussed below could be termed a second component without departing from the teachings of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should not be interpreted in an idealized or overly formal sense unless expressly so defined herein.

Hereinafter, the inventive concept will be described with reference to the accompanying drawings.

FIGS. 1 to 5 illustrate an upper-limb rehabilitation robot according to an embodiment of the inventive concept.

As illustrated in the drawings, the upper-limb rehabilitation robot 10 according to the embodiment of the inventive concept includes a finger exercise device 11, a wrist exercise device 61, and an upper-limb exercise device 101.

The finger exercise device 11 is mounted on the back of a patient's hand and exercises the patient's fingers for rehabilitation.

The finger exercise device 11 includes a back-of-hand mounted part 21, a strap actuator 23, finger coupling parts 31, and straps 41.

The back-of-hand mounted part 21 has a shape corresponding to the surface of the back of a person's hand and is mounted on the back of the patient's hand by a non-illustrated fixing means such as a band.

The strap actuator 23 for winding or unwinding the straps 41 is provided on the back-of-hand mounted part 21.

The strap actuator 23 includes a strap winding roller 25 that is disposed across the direction of movement of the straps 41 and around which the straps 41 are wound or from which the straps 41 are unwound, and a strap drive motor 27 that rotates the strap winding roller 25 forward or backward.

The straps 41 are wound around, or unwound from, the strap winding roller 25 by rotating the strap drive motor 27 forward or backward.

Furthermore, the back-of-hand mounted part 21 is equipped with a plurality of strap guide rollers 29 that are located on travel paths of the straps 41 moving along an upper surface of the back-of-hand mounted part 21 and that guide the movement of the straps 41. As many strap guide rollers 29 as the straps 41 are provided, and the plurality of strap guide rollers 29 are arranged parallel to each other with an interval therebetween.

The finger coupling parts 31 have a ring shape made of a silicone material and are coupled to the patient's fingers, respectively. In this embodiment, the finger coupling parts 31 are illustrated as being provided to correspond to the index finger, the middle finger, the ring finger, and the little finger, respectively. Without being limited thereto, however, in another embodiment, the finger coupling parts 31 may be provided to correspond to one or more of the thumb, the index finger, the middle finger, the ring finger, and the little finger.

The straps 41 have a band shape with a predetermined width and form the travel paths on the back-of-hand mounted part 21. Each of the straps 41 includes one end portion supported on a corresponding one of the finger coupling parts 31 and an opposite end portion connected to the strap actuator 23.

The straps 41 are made of a material that elastically deforms along the lengthwise direction depending on bending motion of the fingers. Here, the straps 41 are preferably designed to minimize a resistance force when a patient who has difficulty applying a large force to fingers bends the fingers.

Furthermore, each of the straps 41 may have, on a planar surface thereof, a strain sensor that measures a force exerted on the strap 41 depending on elastic deformation of the strap 41.

The strain sensor includes a strain sensor that has a metal pattern forming a circuit and a terminal electrically connected with the metal pattern. The strain sensor may be printed on, or attached to, the planar surface of the strap 41.

Accordingly, a force exerted on the strap 41 is measured by measuring resistance applied to the metal pattern depending on the degree to which the strain sensor is stretched, for example, depending on the degree to which the strap 41 is lengthened or shortened along the lengthwise direction.

For example, when the strap 41 is stretched, the resistance value of the metal pattern of the strain sensor is increased with an increase in the length of the metal pattern. In contrast, when the strap 41 is compressed and shortened, the resistance value of the metal pattern is decreased with a decrease in the length of the metal pattern.

Further, the strap actuator 23 is controlled depending on the resistance value measured by the strain sensor.

For example, when the resistance value measured by the strain sensor exceeds a reference resistance range, the corresponding finger is determined to be bent, and the strap actuator 23 is driven to wind and tension the strap 41.

By tensioning the strap 41, the finger coupled to the corresponding finger coupling part 31 is unfolded without being bent.

Further, when the strap actuator 23 is driven to unwind the strap 41, the strap 41 is unwound from the strap actuator 23, and the finger is bent while returning to the initial state.

As described above, the patient's fingers may be exercised for rehabilitation by driving the strap actuator 23 to wind or unwind the straps 41 in the state in which the back-of-hand mounted part 21 is mounted on the back of the patient's hand and the finger coupling parts 31 are coupled to the patient's bent fingers, respectively.

The wrist exercise device 61 is provided on the patient's wrist and exercises the patient's wrist.

The wrist exercise device 61 includes a wrist mounting part 71 on which the wrist is mounted and a track 81 that is provided along a rotational path of the wrist and that guides rotational motion of the wrist mounting part 71.

The wrist mounting part 71 has a circular cross-section that is open at the top (e.g., a U-shaped cross-section) so as to partially surround the wrist. Accordingly, the patient may stably mount the wrist on the wrist mounting part 71. Here, the wrist mounting part 71 may be equipped with a band to fix the wrist so as to prevent the wrist from being separated from the wrist mounting part 71 when the patient exercises the wrist.

The track 81 has a U-shaped cross-section to correspond to the shape of the wrist mounting part 71. The track 81 is supported by a support 85. The support 85 includes a gap adjustment knob 87 for adjusting the gap between the wrist mounting part 71 and an elbow mounting part 111 of the upper-limb exercise device 101 that will be described below.

A roller 91 is provided in the track 81 to correspond to rotational motion of the wrist mounting part 71 relative to the track 81. The roller 91 is provided in the track 81 so as to be movable while rolling and is connected with the wrist mounting part 71 by a roller support bracket 93.

Accordingly, the wrist mounting part 71 is moved along the track 81 by a rotational force that acts on the wrist.

As described above, when the patient mounts the wrist on the wrist mounting part 71 and thereafter applies a rotational force to the wrist, the wrist mounting part 71 moves along the track 81 so that the wrist naturally rotates.

The upper-limb exercise device 101 is spaced apart from the wrist exercise device 61 and exercises an upper limb 7 of the patient.

The upper-limb exercise device 101 includes the elbow mounting part 111 on which the elbow is mounted and a lifting operation part 121 that operates depending on lifting motion of the upper limb 7.

The elbow mounting part 111 has a circular cross-section that is open at the top (e.g., a U-shaped cross-section) so as to partially surround the elbow. Accordingly, the patient may stably mount the elbow on the elbow mounting part 111. Here, the elbow mounting part 111 may be equipped with a band to fix the elbow so as to prevent the elbow from being separated from the elbow mounting part 111 when the patient exercises the upper limb 7.

The elbow mounting part 111 is connected with the support 85 of the wrist exercise device 61 by a connecting bracket 115.

The lifting operation part 121 includes a pair of joint links 123 and 125, a pivot joint 127, and a pivot motion part that allows the pair of joint links 123 and 125 and the pivot joint 127 to pivot depending on lifting motion of the upper limb 7 mounted on the elbow mounting part 111.

The pivot motion part includes a spring 133, a first wire pulley 141, a second wire pulley 143, a third wire pulley 145, a fourth wire pulley 147, and a wire 151.

The pair of joint links 123 and 125 include the first joint link 123, one end portion of which is coupled to the elbow mounting part 111 and the second joint link 125 coupled to an opposite end portion of the first joint link 123.

The first joint link 123 has a hollow bar shape. The one end portion of the first joint link 123 is pivotally hinged to the elbow mounting part 111, and the opposite end portion of the first joint link 123 is pivotally hinged to one end portion of the second joint link 125 and the pivot joint 127.

The spring 133, which is compressed or stretched, is received in the first joint link 123. The spring 133 has one end portion supported by the first joint link 123 and an opposite end portion to which the wire 151 is connected. Here, the first joint link 123 and the wire 151 may be connected by a connecting block (not illustrated) that is interposed between the first joint link 123 and the wire 151, without being directly connected together.

The one end portion of the second joint link 125 is hinged to the opposite end portion of the first joint link 123 and the pivot joint 127.

A plurality of wire pulleys are provided on a travel path of the wire 151.

The plurality of wire pulleys include the first wire pulley 141 provided in the first joint link 123 so as to be spaced apart from the spring 133, the second wire pulley 143 provided in the portion where the first joint link 123 is hinged to the one end portion of the second joint link 125, the third wire pulley 145 provided in the pivot joint 127, and the fourth wire pulley 147 provided in an opposite end portion of the second joint link 125.

The wire 151 has a predetermined length. The wire 151 starts from the opposite end portion of the spring 133, passes over the first wire pulley 141, the second wire pulley 143, and the third wire pulley 145, and is supported on the fourth wire pulley 147.

The pivot joint 127 pivotally supports the opposite end portion of the first joint link 123 and the one end portion of the second joint link 125.

The third wire pulley 145 is provided on a lower side of the pivot joint 127 so as to be exposed.

Figure 4:
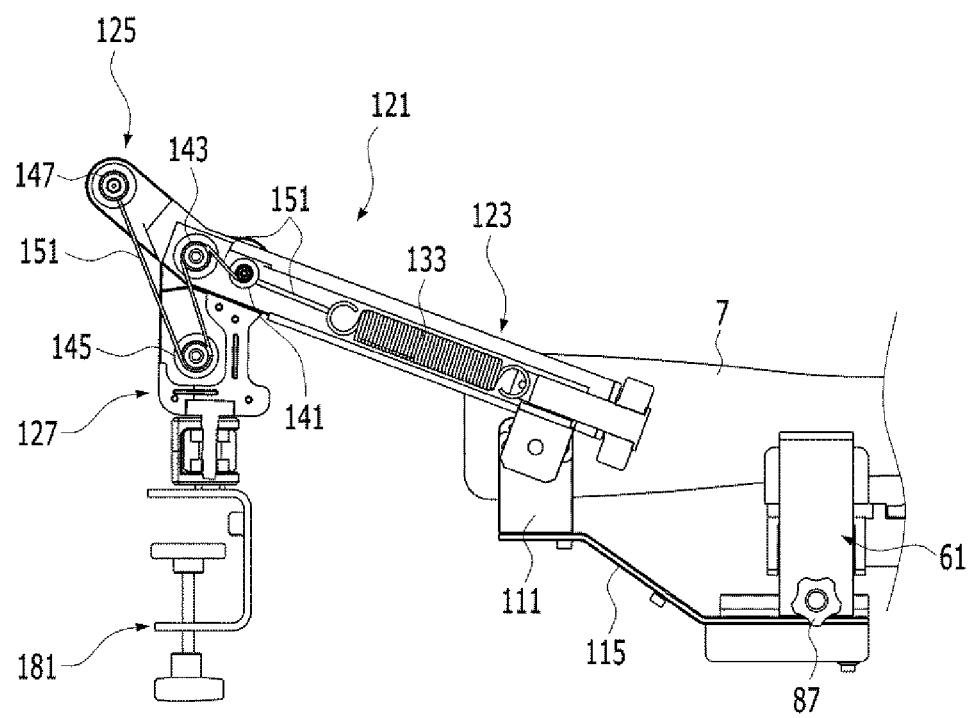
FIG. 4 is a sectional view illustrating major components of the upper-limb rehabilitation robot of FIG. 1.
Figure 5:
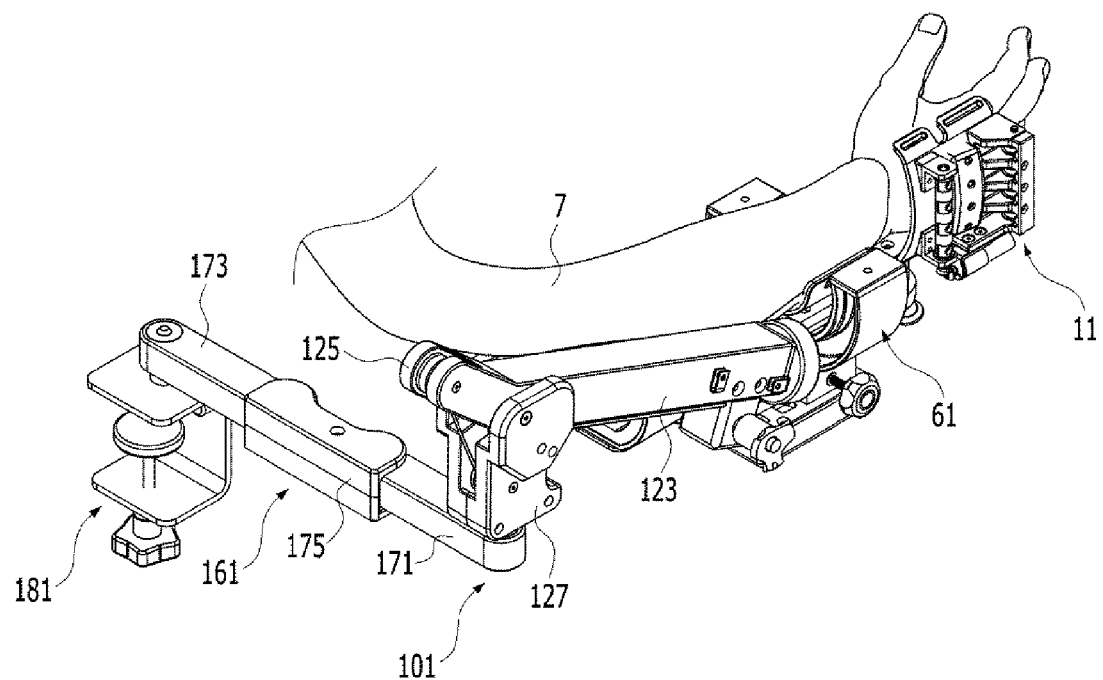
FIG. 5 is a view illustrating a state in which an upper limb is mounted on the upper-limb rehabilitation robot of FIG. 1.

Accordingly, when the elbow of the patient is mounted on the elbow mounting part 111, as illustrated in FIG. 4, the wire 151 between the third wire pulley 145 and the fourth wire pulley 147 is lengthened while the spring 133 is stretched. At this time, the gravity load generated by mounting the elbow of the patient on the elbow mounting part 111 is compensated for by the elastic force of the spring 133.

Meanwhile, when the patient raises the upper limb 7, the wire 151 between the third wire pulley 145 and the fourth wire pulley 147 is shortened at the same time that, when viewed in FIG. 4, the second joint link 125 pivots in the counterclockwise direction and the spring 133 is compressed.

Accordingly, the patient may exercise the upper limb 7 for rehabilitation without applying an excessive force to the upper limb 7 when moving the upper limb 7 upward and downward.

Furthermore, the upper-limb exercise device 101 according to an embodiment of the inventive concept may further include a left/right operation part 161 that operates depending on a left/right movement of the upper limb 7.

The left/right operation part 161 includes a pair of arms 171 and 173 configured to be movable toward or away from each other.

End portions of the pair of arms 171 and 173 that face each other are pivotally hinged to a bracket 175 to correspond to the left/right movement of the upper limb 7.

An opposite end portion of the arm 171 disposed adjacent to the pivot joint 127 is hinged to the pivot joint 127, and an opposite end portion of the remaining arm 173 is hinged to a fixing part 181 for fixing the upper-limb rehabilitation robot 10 according to the embodiment of the inventive concept to a structure in a cantilever manner.

Accordingly, the patient may exercise the upper limb 7 for rehabilitation without applying an excessive force to the upper limb 7 when moving the upper limb 7 leftward and rightward.

Furthermore, because the upper-limb rehabilitation robot 10 according to the embodiment of the inventive concept is supported in a cantilever manner by the fixing part 181, the upper-limb rehabilitation robot 10 may carry out rehabilitation exercises while changing joint angles of the patient's hand, wrist, and upper limb in a state of being spaced apart from the floor.

As described above, according to the inventive concept, the upper-limb rehabilitation robot includes the finger exercise device that is mounted on the back of the patient's hand and that exercises the patient's fingers for rehabilitation, the wrist exercise device that is provided on the patient's wrist and that exercises the patient's wrist, and the upper-limb exercise device that exercises the patient's upper limb. Accordingly, the upper-limb rehabilitation robot enables the patient to do rehabilitation exercises while changing the joint angles of the patient's hand, wrist, and upper limb without applying an excessive force.

According to the inventive concept, the upper-limb rehabilitation robot enables a patient to do rehabilitation exercises while changing joint angles of the patient's hand, wrist, and upper limb without applying an excessive force.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An upper-limb rehabilitation robot comprising:
   a finger exercise device configured to be mounted on the back of a patient's hand and configured to exercise a finger of the patient for rehabilitation;
   a wrist exercise device provided on a wrist of the patient and configured to exercise the wrist of the patient; and
   an upper-limb exercise device spaced apart from the wrist exercise device and configured to exercise an upper limb of the patient,
   wherein the finger exercise device includes:
      a back-of-hand mounted part configured to be mounted on the back of the patient's hand;
      a strap configured to form a travel path on the back-of-hand mounted part;
      a finger coupling part configured to support one end portion of the strap and configured to be coupled to the finger of the patient; and
      a strap actuator provided on the back-of-hand mounted part and configured to wind or unwind the strap supported on the finger coupling part, and
   wherein the strap actuator includes:
      a strap winding roller around which the strap is wound or from which the strap is unwound; and
      a strap drive motor configured to rotate the strap winding roller forward or backward.

2. The upper-limb rehabilitation robot of claim 1, further comprising:
   a strap guide roller provided on the travel path of the strap and configured to guide a movement of the strap.

3. The upper-limb rehabilitation robot of claim 1, wherein the wrist exercise device includes:
   a wrist mounting part on which the wrist is mounted; and
   a track provided along a rotational path of the wrist and configured to guide rotational motion of the wrist mounting part.

4. The upper-limb rehabilitation robot of claim 1, wherein the upper-limb exercise device includes:
   an elbow mounting part on which an elbow is configured to be mounted; and
   a lifting operation part configured to operate depending on lifting motion of the upper limb mounted on the elbow mounting part.

5. An upper-limb rehabilitation robot comprising:
   a finger exercise device mounted on the back of a patient's hand and configured to exercise a finger of the patient for rehabilitation;
   a wrist exercise device provided on a wrist of the patient and configured to exercise the wrist of the patient;
   an upper-limb exercise device spaced apart from the wrist exercise device and configured to exercise an upper limb of the patient,
   wherein the wrist exercise device includes:
      a wrist mounting part on which the wrist is mounted; and
      a track provided along a rotational path of the wrist and configured to guide rotational motion of the wrist mounting part; and
      a roller connected with the wrist mounting part and provided in the track so as to be movable while rolling along the track by the rotational motion of the wrist mounting part.

6. An upper-limb rehabilitation robot comprising:
   a finger exercise device mounted on the back of a patient's hand and configured to exercise a finger of the patient for rehabilitation;
   a wrist exercise device provided on a wrist of the patient and configured to exercise the wrist of the patient; and
   an upper-limb exercise device spaced apart from the wrist exercise device and configured to exercise an upper limb of the patient,
   wherein the upper-limb exercise device includes:
      an elbow mounting part on which an elbow is mounted; and
      a lifting operation part configured to operate depending on lifting motion of the upper limb mounted on the elbow mounting part, and
   wherein the lifting operation part includes:
      a first joint link pivotally hinged to the elbow mounting part;
      a second joint link pivotally hinged to the first joint link;
      a pivot joint pivotally hinged to the first joint link and the second joint link; and
      a pivot motion part configured to allow the first joint link, the second joint link, and the pivot joint to pivot depending on the lifting motion of the upper limb configured to be mounted on the elbow mounting part.

7. The upper-limb rehabilitation robot of claim 6, wherein the upper-limb exercise device further includes:

a medial or lateral operation part configured to operate depending on a medial or lateral movement of the upper limb.

8. The upper-limb rehabilitation robot of claim 7, wherein the medial or lateral operation part includes:
- a pair of arms configured to be movable toward or away from each other; and
- a bracket pivotally hinged to facing end portions of the pair of arms to correspond to the medial or lateral movement of the upper limb, and
- wherein one of the pair of arms is hinged to the pivot joint.

9. The upper-limb rehabilitation robot of claim 6, wherein the pivot motion part includes:
- a spring having one end portion supported by the first joint link, the spring being configured to be compressed or stretched;
- a first wire pulley provided in the first joint link so as to be spaced apart from the spring;
- a second wire pulley provided in a portion where the first joint link is hinged to one end portion of the second joint link;
- a third wire pulley provided in the pivot joint;
- a fourth wire pulley provided in an opposite end portion of the second joint link; and
- a wire having a predetermined length and including one end portion supported by an opposite end portion of the spring and an opposite end portion supported by the fourth wire pulley, wherein the wire passes over the first wire pulley, the second wire pulley, and the third wire pulley.

* * * * *